United States Patent
Edwards et al.

[15] 3,703,017
[45] Nov. 21, 1972

[54] ALTERNATING SQUIRT WINDSHIELD WASHER

[72] Inventors: Ralph W. Edwards, Bellbrook; Ronald G. Petry, Xenia, both of Ohio

[73] Assignee: General Motors Corporation, Detroit, Mich.

[22] Filed: Dec. 7, 1970

[21] Appl. No.: 95,825

[52] U.S. Cl. .............................................. 15/250.02
[51] Int. Cl. .............................................. B60s 1/48
[58] Field of Search .......... 15/250.02, 250.04, 250.01

[56] References Cited

UNITED STATES PATENTS

| | | | |
|---|---|---|---|
| 3,503,090 | 3/1970 | Romanowski | 15/250.02 |
| 3,503,091 | 3/1970 | Petry et al. | 15/250.02 |
| 3,562,839 | 2/1971 | Riester | 15/250.02 |

*Primary Examiner*—Peter Feldman
*Attorney*—W. E. Finken and W. A. Schuetz

[57] ABSTRACT

In a preferred form, this disclosure relates to a windshield cleaning apparatus for cleaning a windshield of an automotive vehicle. The windshield cleaning apparatus comprises a wiper unit having first and second oscillatable windshield wipers which are movable in opposite directions through inboard and outboard strokes during each cycle of operation and a washer unit having a pump and a diverter valve means actuated in timed relationship with the wiper unit to effect alternate squirting of all of the washer fluid being delivered by the pump in the path of movement of the first wiper as the latter is moved through its inboard stroke and to squirt all of the washer fluid being delivered by the pump in the path of movement of the second wiper as the latter is being moved through its outboard stroke during each cycle of operation of the wipers.

2 Claims, 11 Drawing Figures

PATENTED NOV 21 1972 3,703,017

INVENTORS
Ralph W. Edwards &
BY Ronald G. Petry

W.A. Schuetz
ATTORNEY

INVENTORS
Ralph W. Edwards &
BY Ronald G. Petry
W. A. Schuetz
ATTORNEY

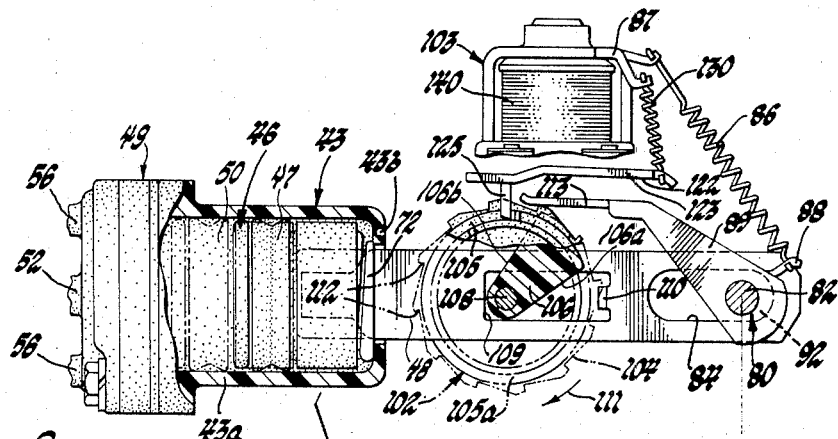
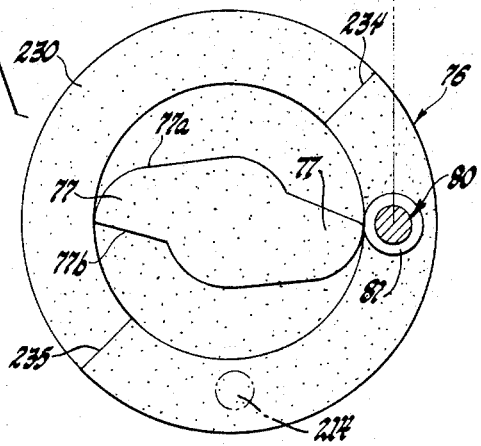
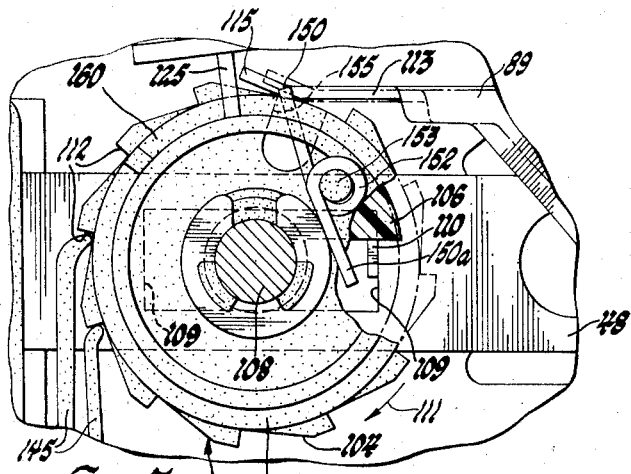
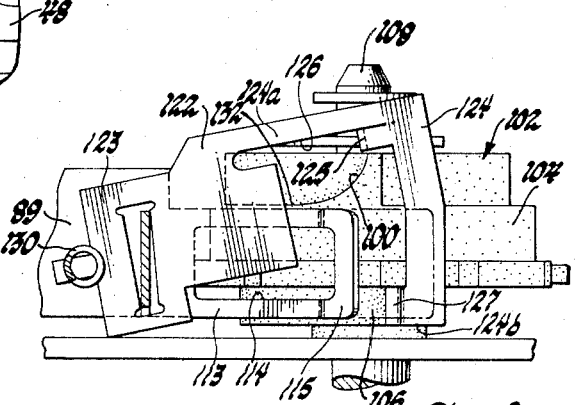
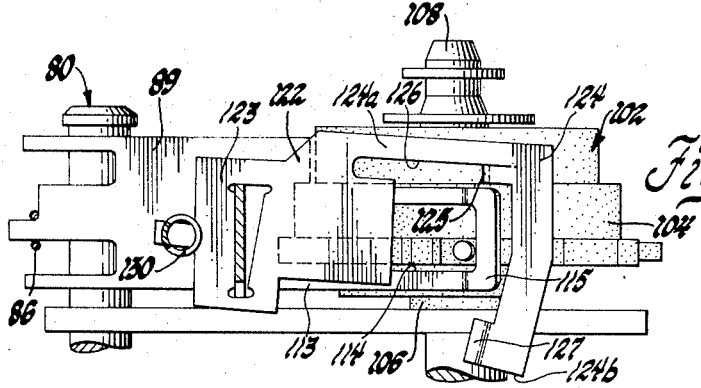

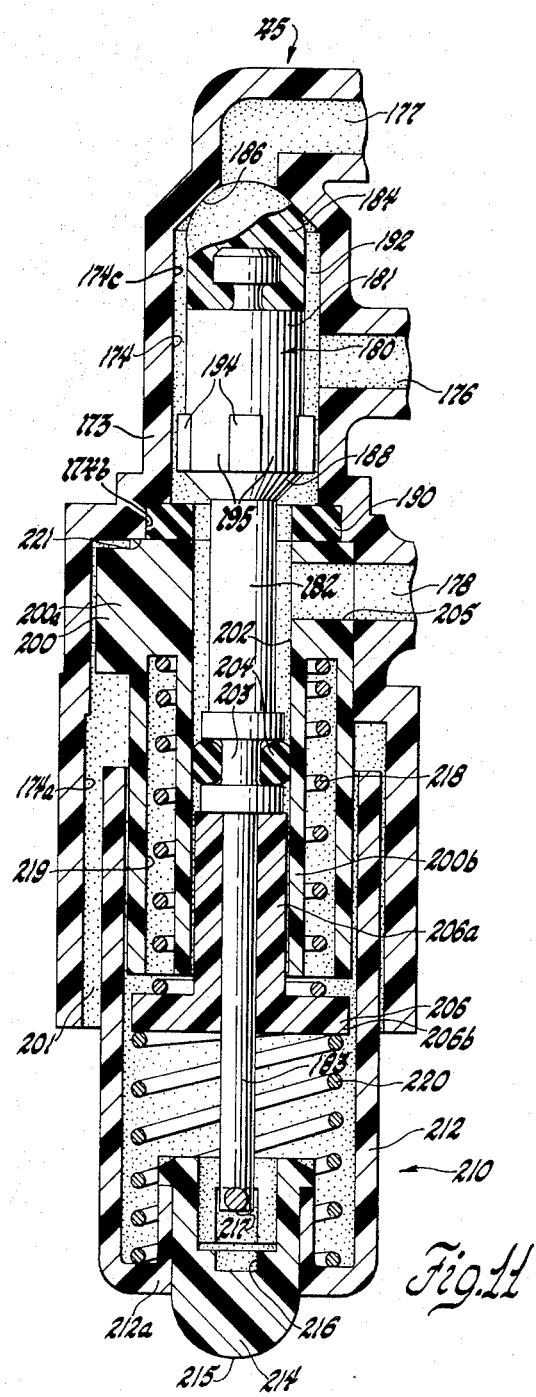
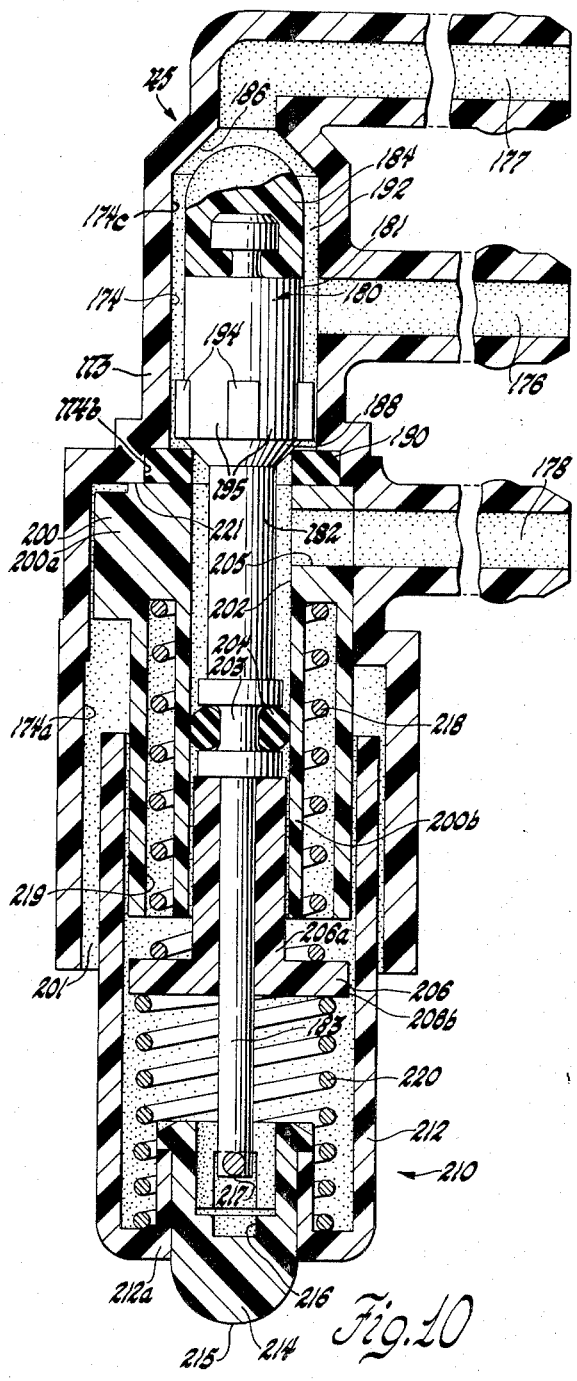
Fig. 11
Fig. 10
INVENTORS
Ralph W. Edwards &
BY Ronald G. Petry
W. A. Schutz
ATTORNEY

ALTERNATING SQUIRT WINDSHIELD WASHER

The present invention relates to a windshield cleaning apparatus, and more particularly to a windshield cleaning apparatus comprising a wiper unit having a pair of wipers which are oscillatable in opposite directions through inboard and outboard strokes and a washer unit which is operated in timed relationship with the wiper unit and which is operable to squirt washer fluid in the path of movement of one of the wipers during the inboard stroke of the wipers and in the path of movement of the other of the wipers during the outboard stroke of the wipers.

Heretofore, windshield cleaning systems have been provided in which washer fluid is squirted ahead of and in the path of movement of the windshield wipers as they are moved through their strokes. In these known systems, however, the windshield washer fluid was delivered ahead of both of the wiper blades simultaneously. This has resulted in washer fluid being wiped toward the center of the windshield and downwardly towards its lower edge.

In accordance with the provisions of the present invention, a windshield cleaning apparatus is provided in which the washer fluid is alternately squirted on the passenger side of the windshield when the wiper on the passenger side is moved toward the adjacently located side edge of the windshield and squirted on the driver's side of the vehicle when the wiper at the driver's side is moved through its outboard stroke. This prevents washer fluid from being wiped toward the center of the windshield, but instead causes all of the washer fluid to be wiped toward the opposite sides of the vehicle. This maximizes visibility through the center portion of the windshield and prevents washer fluid from being wiped downwardly onto the center portion of the cowl of the vehicle.

Accordingly an important object of the present invention is to provide a new and improved windshield cleaning apparatus for cleaning a windshield of an automotive vehicle and which includes a wiper unit having a pair of spaced wipers which are movable in opposite directions through first and second strokes during each cycle of operation and a washer unit which is operated in timed relationship with the wiper unit and which is operable to alternately squirt washer fluid on the passenger side of the vehicle when the passenger side wiper is moved toward its adjacently located side edge of the windshield and to squirt washer fluid on the driver's side of the vehicle when the wiper on the driver's side is moved toward its adjacently located side edge of the windshield.

Another object of the present invention is to provide a new and improved windshield cleaning apparatus for cleaning the windshield of an automotive vehicle and which includes a wiper unit having a pair of wipers which are movable through inboard and outboard strokes during each cycle of operation and a washer unit which is operated in timed relationship with the wiper unit and which is operable to alternately squirt washer fluid in the path of movement of one of the wipers as the wipers are moved through their inboard strokes and in the path of movement of the other of the wiper blades when the wipers are moved through their outboard stroke.

Yet another object of the present invention is to provide a new and improved windshield cleaning apparatus for cleaning the windshield of an automotive vehicle and which includes a wiper unit having a pair of wipers which are oscillatable through inboard and outboard strokes during each cycle of operation and a washer unit which is operated in timed relationship with the wiper unit and which is operable to alternately squirt washer fluid in the path of movement of the wiper adjacent the passenger side of the vehicle during the inboard stroke of the wipers and to squirt washer fluid in the path of movement of the wiper at the driver's side of the vehicle during the outboard stroke of the wipers.

A further object of the present invention is to provide a new and improved windshield cleaning apparatus, as defined in the next preceding object, and which includes a pair of washer nozzles, preferably carried by the windshield wipers, a pump for delivering washer fluid under pressure when energized, a diverter valve means for selectively communicating the pump with either one of the washer nozzles and a cam means driven in timed relationship with the windshield wipers for actuating the diverter valve means to effect delivery of all of the washer fluid from the pump to the nozzle carried by the wiper on its passenger side of the vehicle during the inboard stroke of the wipers and to effect delivery of all of the washer fluid to the other washer nozzle carried by the wiper adjacent the driver's side of the vehicle during movement of the wipers through their outboard stroke during each cycle of operation of the windshield wipers.

A still further object of the present invention is to provide a new and improved windshield cleaning apparatus, as defined in the next preceding object, and wherein the actuating means comprises a rotatable cam driven by the wiper unit for effecting reciprocable movement of a valve member of the diverter valve means for selectively communicating one or the other washer nozzle with the pump means.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which:

FIG. 6 is a view similar to that shown in FIG. 5, but showing different parts thereof in different positions;

FIG. 7 is an enlarged fragmentary elevational view of part of the windshield cleaning apparatus of the present invention;

FIG. 8 is an enlarged fragmentary elevational view of part of the windshield cleaning mechanism of the present invention and looking in the direction of the arrows 8—8 of FIG. 3;

FIG. 9 is a view similar to that shown in FIG. 8, but showing different parts thereof in different positions;

FIG. 10 is an enlarged cross-sectional view of part of the windshield cleaning mechanism of the present invention; and FIG. 11 is a fragmentary sectional view like that shown in FIG. 10, but showing different parts thereof in different positions.

Figure 1:
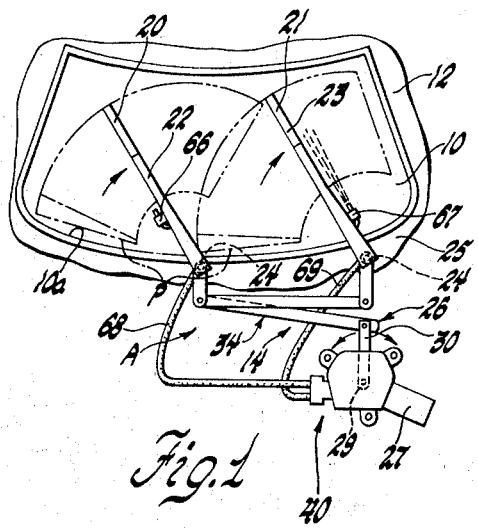
FIG. 1 is a fragmentary front elevational view of a vehicle embodying the novel windshield cleaning apparatus of the present invention.
Figure 2:
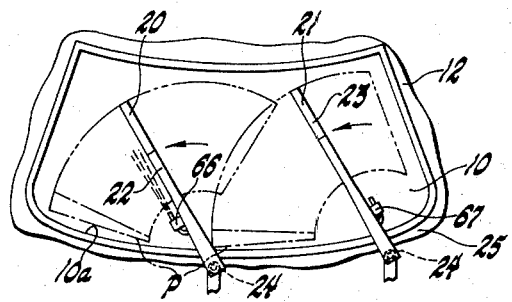
FIG. 2 is a fragmentary view similar to that shown in FIG. 1, but showing different parts thereof in different positions.

As representing a preferred embodiment of the present invention, the drawings show a windshield cleaning apparatus A for cleaning a windshield 10 of an automotive vehicle 12. The windshield cleaning apparatus A broadly comprises a wiper unit 14 for wiping the windshield and a programmed washer unit 16 for delivering intermittent squirts of washing fluid onto the windshield 10 and which is adapted to be operated conjointly in timed relationship with the wiper unit for a predetermined number of wiper strokes.

The wiper unit 14 comprises a pair of windshield wipers 20 and 21 of any suitable or conventional construction and which are located on the passenger and driver's side of the windshield 10. The wipers 20 and 21 are adapted to be oscillated in opposite directions through first or inboard and second or outboard strokes during each cycle of operation. The wipers 20 and 21 are also adapted to be moved to a depressed park position P adjacent the lower edge 10a of the windshield when wiper operation is being terminated. The wipers 20 and 21 each comprise a wiper arm 22 for supporting a wiper blade assembly 23 and with the wiper arms being carried by oscillatable drive pivots 24 rotatably supported by suitable brackets (not shown) secured to a support structure 25 of the vehicle 12. The drive pivots 24 are carried by the vehicle in spaced locations and the wipers 20 and 21 are adapted to be oscillated in tandem through their inboard and outboard strokes.

The drive pivots 24 are adapted to be oscillated by a drive mechanism 26 which includes a unidirectional electric wiper motor 27 connected via a gear reduction unit 28 to a unidirectional output shaft 29 having a crank arm 30 fixed thereto. The electric wiper motor 27 and gear reduction unit 28 could be of any suitable or conventional construction, but preferably is of the type shown and described in U.S. Pat. No. 3,253,206, issued May 24, 1966 and to which resort may be had for a full understanding of the operation of the electric wiper motor 27 and gear reduction unit 28. Suffice it to say that the gear reduction unit includes a worm gear 31 which is fixed to the output shaft of the motor 27 and which in turn is in meshed engagement with a worm wheel 32 fixed to the output shaft 29. The crank arm 30 is drivingly connected with the oscillatable drive pivots 24 via a suitable or conventional linkage arrangement 34 and when rotated functions through the linkage arrangement to oscillate the drive pivots 24, which in turn causes the wipers 20 and 21 to be oscillated in tandem through arcuate paths through their inboard and outboard strokes.

The washer unit 16, when actuated, is adapted to be operated conjointly with the wiper unit 14 and comprises a washer pump assembly 40 for intermittently providing squirts of washing fluid to be applied to the windshield 10. The washer pump assembly 40 comprises, in general, a support means or frame 41 which is suitably secured to a housing 42 for supporting the gear reduction unit 26, a washer pump 43 carried by the frame 41 and which has an interruptible driving connection with the wiper motor 27, a control mechanism 44 which is operable to establish a driving connection between the pump 43 and the wiper unit motor 27 for a predetermined number of wiper strokes and then automatically interrupt the driving connection therebetween, and a diverter valve means 45 which is operated in timed relationship with the wiper motor 27 and which functions to divert all of the washer fluid into the path of movement of the passenger side wiper 20 during movement of the wipers 20 and 21 through their inboard stroke and for diverting all of the washer fluid in the path of movement of the driver's side wiper 21 during movement of the wipers 20 and 21 through their outboard stroke.

The washer pump 43 comprises a plastic pump housing 43a secured to the support frame 41 and a reciprocably movable plunger or plunger means 46 slidably received within the housing 43a. The plunger 46 includes a piston 47 and a flat pump rod 48 having one end connected with the piston 47 and its other end projecting rearwardly i.e., toward the right as viewed in FIGS. 3 and 4, beyond the adjacent rearward end 43b of the housing 43. As shown in FIG. 4, the pump rod 48 adjacent its rearward end is slidably supported by a flange 41a of the frame 41. The pump 43 also includes a valve chamber part 49 secured to the housing 43a at its forward end remote from the pump rod 48 and which defines with the piston 47 a chamber 50. The valve chamber part 49 contains an inlet check valve 51 for controlling communication between an inlet nipple 52 and the chamber 50 and a pair of outlet check valves (not shown) for controlling communication between the chamber 50 and a pair of outlet nipples 56.

The plunger 46 is adapted to be reciprocably moved through intake and discharge strokes. When the plunger is moved through its intake stroke, toward the right as viewed in FIGS. 3–6 of the drawings, washer fluid is drawn from a reservoir 60 via conduit 61, inlet nipple 52 and past the check valve 51 into the chamber 49. When the plunger is moved through its discharge stroke, toward the left, as viewed in FIGS. 3–6, the fluid in the chamber 50 is forced under pressure past the outlet check valve (not shown) and delivered via outlet nipples 56 and conduit means 65 to the diverter valve means 45. The washer fluid from the diverter valve means 45 is delivered either to a nozzle 66 carried by the wiper 20 and located on the left side thereof, as viewed in FIG. 1, or to a nozzle 67 carried by and located on the right side of the wiper 21 via flexible conduits 68 and 69, respectively, and in a manner to be hereinafter more fully described.

The plunger 46 is moved through its discharge stroke by a compression spring 72 (see FIG. 3) encircling the pump rod 48 and having one end in abutting engagement with the end wall 43b of the housing 43a and its other end in abutting engagement with the piston 47 at its side opposite the chamber 50. The compression spring 72 biases the plunger 46 toward engagement with the valve chamber part 49.

Figure 5:
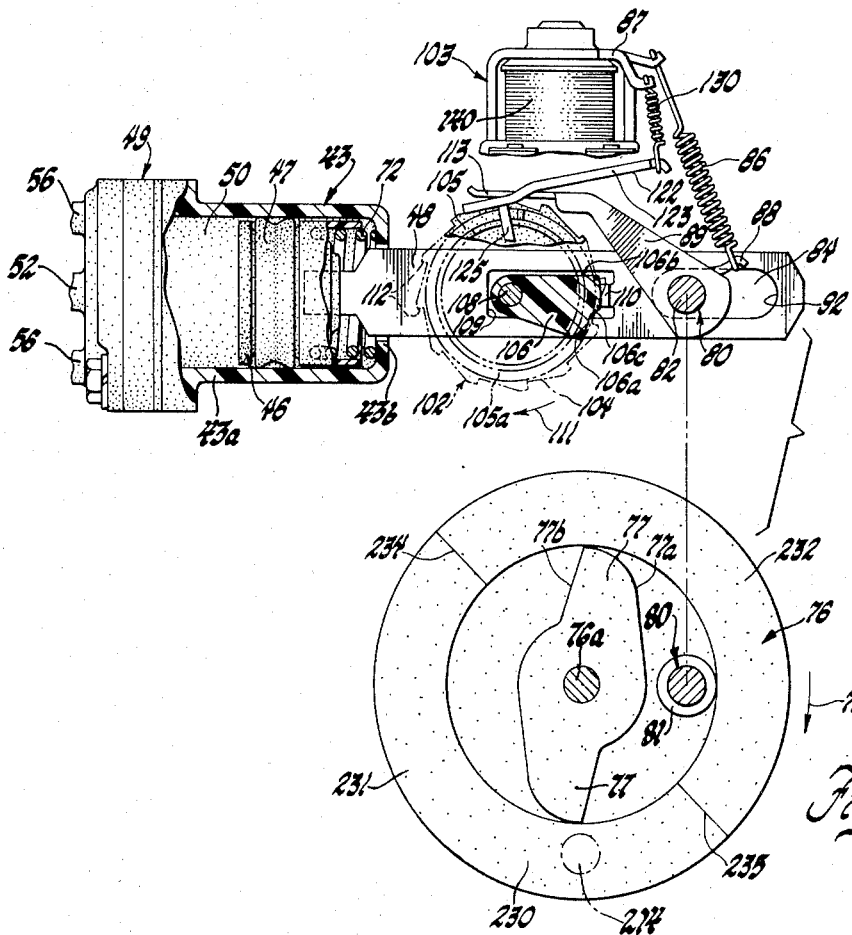
FIG. 5 is an exploded view, with parts shown in section, of part of the windshield cleaning apparatus of the present invention.

The plunger 46 is adapted to be moved through its intake stroke in opposition to the biasing force of the compression spring 72 by a drive means 75 when the washer unit 16 is placed in operation. The drive means 75 comprises a cam means 76 having a pair of diametrically opposite cam lobes 77 and is rotatably supported by a shaft 76a secured to the support frame 41 and located adjacent the gear reduction unit 26. As best shown in FIGS. 5 and 6, each lobe 77 of the cam means 76 has a rise portion 77a and a fall portion 77b. The cam means 76 is drivingly connected to the worm wheel 32 of the gear reduction unit 26 via a drive pin 78 and is rotated in the direction of the arrow 79 when the worm wheel 32 is rotated in response to energization of the wiper motor 27. The drive pin 78 is secured to the worm wheel 32 and slidably received in a radially extending slot (not shown) on the underside of the cam means 76.

The drive means 75 further includes a cam follower means 80 for moving the plunger 46 through its intake stroke. The cam follower means 80 is biased into engagement with the periphery of the cam lobes 77 and is drivingly connected with the pump rod 48 via a lost motion connection. The lost motion connection enables the driving connection therebetween to be interrupted, as will be hereinafter more fully described.

The cam follower means 80 includes a cam follower roller 81 which rolls in peripheral engagement with the lobes 77 of the cam means 76 and which is rotatably journaled on the lower end of a drive member or pin 82, as viewed in FIG. 4. The drive pin 82 projects upwardly through aligned elongated slots 83 and 84 in the frame and the pump rod 48, respectively, and is connected intermediate its end to one end of a support lever 85. The other end of the lever 85 is pivotally connected to the support frame 41 via pivot pin means 85a.

The cam follower roller 81 is biased into peripheral engagement with the lobes 77 of the cam means 76 by a tension spring 86 having one end connected with an armature frame 87 secured to the frame 41 and its other end connected with an ear 88 on a drive pawl 89 which is pivotally connected to the upper end of the drive pin 82. The armature frame 87 and the pawl 89 comprise part of the control mechanism 44, as will hereinafter be more fully described.

The drive means 75, when the washer unit 16 is energized, moves the plunger 46 through its intake stroke and then permits the spring 72 to move the plunger 46 through its discharge stroke. As shown in FIG. 6, when the plunger 46 is at the end of its intake stroke the cam follower roller 81 will be engaged with the high point of the rise portion 77a of one of the lobes 77 of the cam means 76 and the drive pin 82 will be in engagement with the pump rod 48 at the rearward end 92 of the slot 84. As the cam means 76 is rotated in the direction of the arrow 79, the compression spring 72 moves the plunger 46 through its discharge stroke to deliver a charge of washing fluid and the pump rod 48 and the spring 86 move the cam follower roller 81 along the fall portion 77b of the lobe 77 of the cam means 76 until the roller engages the low point thereof. When in this position the plunger 46 will have completed its discharge stroke. Continued rotation of the cam means 76 in the direction of the arrow 79 causes the rise portion 77a of the next lobe 77 to engage the cam follower roller 81 and move the same toward the right, as viewed in FIGS. 2–6. As the cam follower 81 moves toward the right the drive pin 82, which remains in engagement with the pump rod 48 at the rearward end 92 of the slot 84, moves the pump rod 48 of the plunger 46 toward the right in opposition to the biasing force of the spring 72. During this movement the plunger moves through its intake stroke in which cleaning fluid is drawn from the reservoir 60 into the chamber 50 and the spring 72 is compressed or charged. The intake stroke is completed when the roller 81 is at the high point of the rise portion 77a of this lobe 77 of the cam means 76. Further rotation of the cam means 76 causes the next pumping cycle to be initiated.

The driving connection between the plunger 45 and the wiper motor 25 is controlled by the control mechanism 44. The control mechanism 44 is operable to establish a driving connection between the plunger 46 of the pump 43 for a predetermined number of wiper strokes, during which the plunger 46 is fully reciprocated through its intake and discharge strokes for each of the predetermined number of wiper strokes, and then to automatically, abruptly interrupt the driving connection therebetween after the predetermined number of wiper strokes have been completed.

The control mechanism 44, in general, includes a wiper stroke counting means in the form of an indexible ratchet cam assembly 102 for controlling operation of the pump 43 and which in turn has an interruptible driving connection with the drive pawl 89 pivotally connected to the drive pin 82 of the cam follower means 80. The control mechanism 44 also includes a control means 103 which is operable, when momentarily energized by the operator, to establish a driving connection between the ratchet cam assembly 102 and the drive pawl 89 and which cooperates with the ratchet cam assembly 102 to automatically disconnect the driving connection therebetween upon the ratchet cam assembly 102 being rotated one complete revolution.

As best shown in FIGS. 3–6, the ratchet cam assembly 102 includes a plastic ratchet wheel 104 having a drum 105 and a cam 106 form integral therewith at its upper and lower sides, respectively. The ratchet cam assembly 102 is rotatably supported on a stub shaft 108 which is secured to the support frame 41 and which extends through a second elongated slot 109 in the pump rod 48, the slot 109 enabling the pump rod to be reciprocated relative to the shaft 108.

Figure 3:
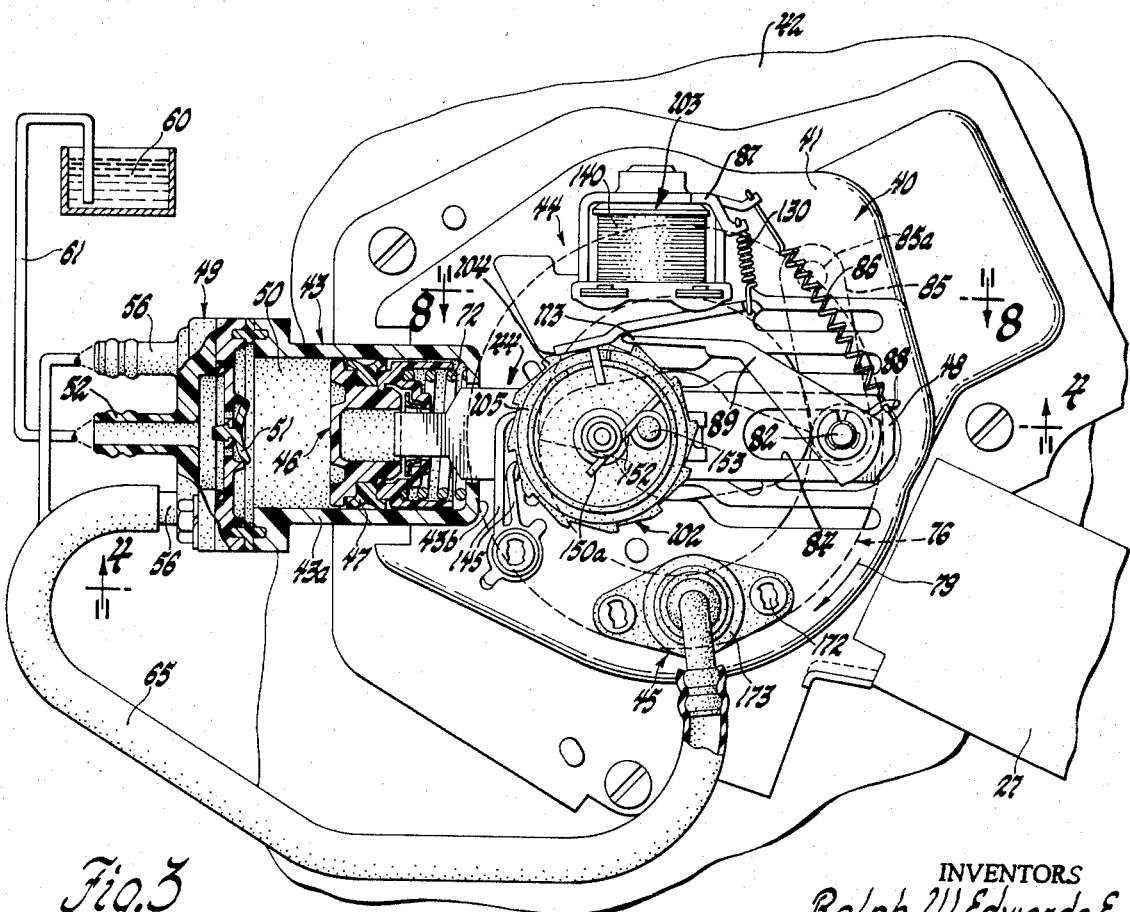
FIG. 3 is an enlarged fragmentary elevational view, with parts shown in section, of part of the windshield cleaning apparatus of the present invention.
Figure 4:
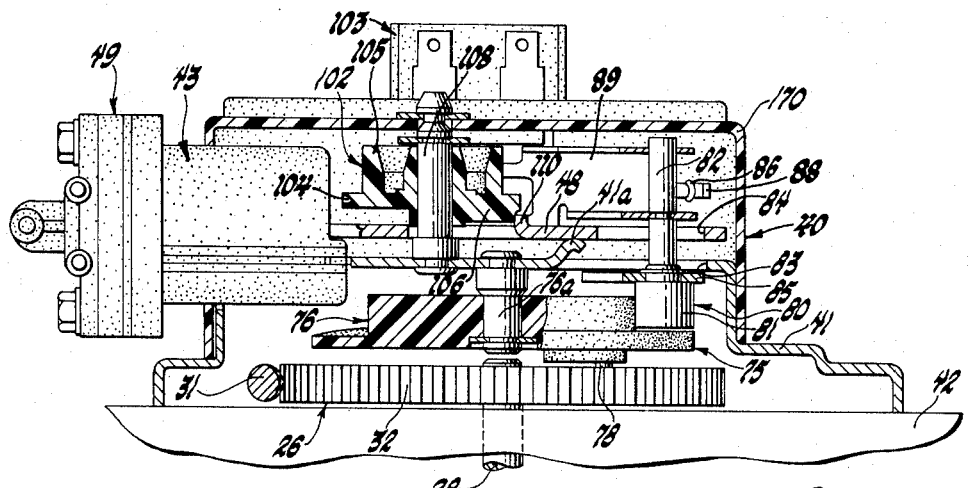
FIG. 4 is a fragmentary sectional view taken approximately along line 4—4 of FIG. 3.

The ratchet cam assembly 102 is normally disconnected from the drive pawl 89 and disposed in a stop position, as shown in FIGS. 3–5, in which it interrupts the driving connection between the plunger 46 of the pump 43 and the cam follower means 80. When in this position, the cam 106 engages a lug or tab 110 on the pump rod 48 to hold the plunger 46 against movement through its discharge stroke by the spring 72 and the spring 72 in its charged condition. The provision of the slot 84 in the pump rod 48 provides a lost motion connection between the drive pin 82 of the cam follower means 80 and the pump rod 48 to enable the drive pin 82 to move relative to the pump rod 48 so that the drive connection therebetween can be interrupted. The cam 106 is generally wedge shaped and has abrupt rise and fall portions 106a and 106b which extend generally radially of the ratchet wheel 104 and a stepped circumferentially extending dwell portion 106c. When the ratchet cam assembly 102 is in a stop position the outermost step of the dwell portion 106c is in engagement with the lug 110 on the pump rod 47.

The ratchet cam assembly 102 is adapted to be intermittently, rotatably indexed in the direction of the arrow 111 by the drive pawl 89 when the later is drivingly connected therewith. To this end, the ratchet wheel 104 has a plurality of circumferentially spaced teeth 112 and the pawl 89, which is continuously moved toward and from the ratchet wheel 104 by the drive pin 82 of the cam follower means 80 when the wiper motor 27 is energized, has an end portion 113 which extends generally tangentially of the ratchet wheel 104 and which is provided with a tooth receiving window or slot 114 (see FIG. 8). The end portion 113 of the pawl 89 is biased toward engagement with the periphery of the ratchet wheel 104 by the spring 86 and its free end 115 is adapted to be hooked behind the adjacent tooth 112 on the ratchet wheel 104 when the pawl 89 is moved away from the ratchet wheel 104 and to index the ratchet cam assembly 102 in the direction of the arrow 111 when moved away from the wheel 104.

Although the drive pawl 89 is continuously moved toward and from the ratchet wheel 104 by the drive pin 82 of the cam follower means 80, it is normally prevented from engaging and indexing the ratchet cam assembly 102 by an armature or control element 122 of the control means 103. The armature 122 is located adjacent the periphery of the ratchet wheel 104 and is suitably pivotally supported at one end portion 123 thereof by the armature frame 87 for movement both radially and axially of the ratchet 104. As best shown in FIGS. 8 and 9, the armature 122 adjacent its free end portion 124 is generally J-shaped and with the long leg 124a of the J-shaped portion 124 forming an extension of the portion 123 and having a finger or flange 125 (see FIGS. 5, 6 or 7) extending transversely to the plane of the armature 122 and generally radially of the ratchet cam assembly 102. The J-shaped portion 124 defines an elongated slot 126 through which the end portion 113 of the pawl 89 is adapted to pass and the short leg 124b of the J-shaped portion defines a ramp surface 127 which is adapted to be engaged by the end portion 113 of the drive pawl 89 as the latter is moved toward and from the ratchet wheel 104 to prevent the end 115 of the pawl from hooking behind the adjacent tooth 112 on the ratchet wheel 104.

The armature 122 is biased by a tension spring 130 toward a first or normal position, as shown in FIGS. 3 and 5, in which the finger 125 engages the upper end 105a of the drum 105 and extends radially inwardly thereof and in which the ramp surface 127 is disposed in the path of movement of the drive pawl 89. The spring 130 has one end connected to the end portion 123 of the armature 122 and its other end connected with the armature frame 87. The spring 130 functions to bias the armature in directions both radially and axially of the ratchet cam assembly 102 and axially downwardly toward the ratchet wheel 104, as viewed in FIGS. 3 and 5. As best shown in FIGS. 8 and 9, the ramp surface 127 serves to engage and move the pawl 89 radially outwardly of the ratchet wheel in opposition to the biasing force of the spring 85 and prevent the end 115 of the drive pawl 89 from hooking behind the adjacent tooth 112 of the ratchet wheel 104. To facilitate this movement, the end of the drive pawl 89 is bent in the direction away from the periphery of the ratchet wheel 104 as clearly shown in FIG. 7.

The armature 122 is movable from its first or normal position, as shown in FIGS. 3 and 5, to a second position, as shown in FIGS. 6 and 7, in which it is positioned such that it permits the end 115 of the pawl to engage and hook behind the teeth 112 of the ratchet wheel 104 and index the latter. When the armature 122 is in its second position the finger 125 is in engagement with the outer periphery of the drum 105 and in engagement with an annular radially extending surface or shoulder 132 at the lower end of the drum 105, as viewed in FIGS. 6 and 7, and the ramp surface 127 is located out of the path of movement of the drive pawl 89. The finger 125 serves to hold the armature 122 in a position which is radially spaced from the periphery of the ratchet wheel 104 so as to enable the drive pawl 89 to drivingly engage the ratchet teeth 112.

The armature 122 is movable from its first position towards its second position in response to momentary energization of an electromagnet means 140 and via the tension spring 130. The electromagnet means 140 is carried by the armature frame 87 and functions when energized to draw the armature 122 radially away from the periphery of the drum 105 to an intermediate position in which it is in engagement with the electromagnet 140. When the electromagnet means is de-energized, the spring 130 will pivot the armature 122 downwardly away from its intermediate position toward the ratchet wheel 104 and radially inwardly against the drum 105 until the finger 125 is in engagement with the annular surface or shoulder 132.

The electromagnet means 140 is an electric circuit with the battery (not shown) of the vehicle and a ground. Energization thereof is controlled by a suitable manually manipulatable two position switch (not shown) in the circuit with the electromagnet means 140. The electric motor 27 of the wiper unit 14 is also in an electric circuit (not shown) and energization thereof is controlled by a second manually operable switch (not shown), and in a manner well known to those skilled in the art.

Operation of the washer pump assembly 40 is initiated when the wiper unit 14 is energized by momentarily energizing the electromagnet means 140. Energization of the electromagnet means 140 causes the armature 122 to be moved from its first or normal position, as shown in FIG. 3, to its intermediate position in which it is held against the electromagnet means 140. When the coil of the electromagnet means is de-energized the spring 130 moves the armature from its intermediate position to its second position, as shown in FIGS. 6 and 7, in which the finger 125 holds the armature 122 in a position which is radially spaced from the periphery of the ratchet wheel 104 so as to enable the end 115 of the pawl 89 to engage and hook around the teeth 112 of the ratchet wheel 104.

As the pawl 89 is moved toward the ratchet wheel 104 by the cam follower means 80, the end 115 thereof engages the adjacently located tooth 112 of the ratchet wheel 104 and is cammed radially outwardly of the ratchet wheel 104 in opposition to the biasing force of the spring 85. To facilitate this latter movement, the ratchet teeth 112 are tapered along their leading edges and the end 115 of the pawl 89 is bent in the direction away from the outer periphery of the ratchet wheel 104. The pawl 89 is cammed radially outwardly of the ratchet wheel until the window 114 thereof is positioned over the adjacently located tooth 112 whereupon the spring 85 moves the end 115 of the pawl 89 radially inwardly relative to the ratchet wheel 104 to hook behind the adjacent tooth 112. Reverse rotation of the ratchet wheel is prevented by a pair of flexible, plastic backlash levers 145 carried by the frame 41.

When the pawl 89 is moved away from the ratchet wheel 104 the end 115 engages the adjacent tooth 112 aNd indexes the ratchet wheel 104 in the direction of the arrow 111 an angular extent equal to the circumferential distance of one ratchet tooth. The number of ratchet teeth provided, in the illustrated embodiment, is 12 and the angular distance through which the ratchet wheel 104 is indexed during each indexing movement is 30°.

As the ratchet wheel 104 is indexed in the direction of the arrow 111 during the first indexing movement, the outer step of the dwell portion 106c of the cam 106 is disengaged from the lug 110 on the pump rod 48. This allows the charged spring 72 to move the plunger 46 of the pump 43 through its discharge stroke. The plunger when moved through its discharge stroke applies fluid under pressure to either the washer nozzle 66 or 67 via the diverter valve means 45, and in a manner to be hereinafter more fully described. When the plunger 46 of the pump 43 moves through its discharge stroke, the drive pin 82 of the cam follower means 80 is engaged by the pump rod 48 at the rearward end 92 of the slot 84 to effect a driving connection between the pump rod 48 and the cam follower means 80. The pawl 89 is moved toward the ratchet wheel 104 by the drive pin 82 during the discharge stroke of the plunger 46 and is moved away from the ratchet wheel 104 to index the same during the intake stroke of the plunger 46.

The ratchet wheel 104 is indexed 30° in the direction of the arrow 111 by the drive pawl 89 during the intake stroke of each cycle of operation of the pump 43. As the ratchet wheel 104 is indexed the finger 125 rides on the annular surface 132 at the lower end of the drum 105. This operation continues through 10 indexing movements.

On the 11th indexing movement of the ratchet cam assembly 102, the rise portions 106a of the cam 106 will move into the path of movement of the lug 110 on the pump rod 48. As best shown in FIG. 6, the plunger 46 is moved through its intake stroke toward the right and the lug 110 of the pump rod will engage the rise portion 106a of the cam 106 and interfere with the indexing movement of the ratchet wheel 104. This engagement between the lug 110 on the pump rod 48 and the rise portion 106a of the cam 106 occurs during the latter portion of the 11th indexing movement of the ratchet wheel 104.

To preclude any jamming action between the lug 110 and the rise portion 106a of the cam 106, which could cause breakage of the parts, the ratchet wheel 104 is provided with a flexible tooth 150 which is engaged by the drive pawl 89 during the 11th indexing movement. The flexible tooth yields to allow the lug 110 on the pump rod 48 upon engaging the rise portion 106a of the cam 106 to clear the latter and then functions to rotate the ratchet cam assembly through the remaining portion of the 11th indexing movement to position the lower step of the dwell portion 106c in front of the lug 110 on the pump rod 48 to prevent the plunger 46 from being moved through its discharge stroke upon completion of the intake stroke. This interrupts the driving connection between the pump rod 48 and the cam follower means 80, and with the latter now moving relative to the pump rod 48 due to the provision of the slot 84 in the pump rod 48.

The flexible tooth 150 comprises one end of a torsion spring 152 carried on a post 153 within the drum 105. The torsion spring has one end 150a which is received within an annular recess in the post 108 to retain the ratchet cam assembly 102 against axial movement relative to the post 108. The other end of the torsion spring is the flexible tooth 150 which extends through a circumferentially extending slot 155 in the side wall of the ratchet wheel 104. The spring bias is such that the tooth end 150 is normally biased into engagement with the ratchet wheel 104 at the leftmost end of the slot 155, as viewed in FIG. 7, and is disposed midway between two adjacent rigid teeth. The tooth end 150 projects radially outwardly an extent equal to the radial extent of the other teeth 112. The flexible tooth 150 is of sufficient stiffness to enable the drive pawl 89 to rotate the ratchet cam assembly 102 during the 11th indexing movement until the rise portion 106a of the cam 106 interferes with the lug 110 on the pump rod 48. When this interference takes place, the drive pawl 89 which continues to move away from the ratchet wheel 104, causes a tooth 150 to yield and be moved relative to the ratchet wheel 104 from its solid line position toward its dotted line position, as shown in FIG. 7. When the lug 110 on the pump rod 48 clears the rise portion 106 a of the cam 106 the biasing force of the spring 152 causes the ratchet wheel 104 to be rotated through the remaining portion of the indexing movement such that the lower step of the dwell portion 106c of the cam 106 is disposed in front of the lug 110 on the pump rod 48. When this occurs, the driving connection between the pump rod 48 and the cam follower means 80 is interrupted, since the plunger cannot be moved through its discharge stroke by the spring 72.

The driving connection between the pawl 89 and the ratchet wheel 104 is automatically interrupted on the next 12th indexing movement of the ratchet wheel 104. To this end, the drum portion 105 is provided with a sharply rising curved cam surface 160 (see FIG. 7) extending from the annular surface 132 to the end wall 105a of the drum 105. As the ratchet wheel 104 is rotated through its 12th indexing movement, the finger 125 engages the cam surface 160 and is cammed upwardly, as viewed in FIGS. 7 and 8 toward the outer end wall 105a of the drum in opposition to the biasing force of the spring 130 until the finger 125 clears the cam surface 160 whereupon the spring 130 will snap or move the armature 122 to its first or normal position, as shown in FIGS. 3 and 5. When in this position the ramp surface 127 will be disposed in the path of movement of the end 115 of the pawl 89 such that when the pawl is moved toward and from the ratchet wheel 104 it engages the ramp surface 127 and is held away from the ratchet teeth 112 on the ratchet wheel 104.

Also, during the last or 12th indexing movement of the ratchet wheel 104, the lug 110 on the pump rod 48 is cammed from the lower stepped surface onto the upper stepped surface of the dwell portion 106c of the cam 106. This further charges the spring 72 and positions the slot 84 of the pump rod 48 so that the drive pin 82 which moves within the slot during wiper operation, will not engage the pump rod 48 at the rearward end 92 of the slot 84 so as to prevent any clicking noise. To prevent any dirt, etc., from coming into engagement with the washer pump assembly, a suitable removable cover 170 attached to the frame 41 is provided.

In accordance with the provisions of the present invention, the intermittent squirts of washer fluid being delivered by the washer pump 43 are alternately delivered to the nozzles 66 and 67 carried by the wipers 20 and 21 during movement of the wipers through their inboard and outboard strokes, respectively. That is, all of the intermittent squirts of washer fluid from the pump 43 are delivered ahead of and in the path of movement of the wiper 20 during movement of both of the wipers 20 and 21 through their inboard stroke and all of the fluid is delivered ahead of and in the path of movement of the wiper 21 during movement of the wipers 20 and 21 through their outboard stroke. This results in all of the washer fluid being washed toward the sides of the vehicle 12 and with none of the washer fluid being wiped toward the center of the windshield 10 and down onto the cowl or hood located forwardly of the vehicle 12.

This alternate or sequential squirting of the washer fluid to the opposite sides of the windshield 10 during the inboard and outboard strokes of the wiper is effected by the diverter valve means 45. The diverter valve means 45 comprises a stationary, plastic housing 173 which is suitably secured to the frame 41, as by screws 172, and which has a central opening 174. The opening 174 includes a first diameter portion 174a adjacent its lower end, an intermediate diameter portion 174b and a smaller diameter portion 174c adjacent its upper end. The valve housing 173 has an inlet 176 which is in communication with the small diameter opening portion 174c and first and second outlets 177 and 178 which are in communication with the opening portions 174c and 174a, respectively. The inlet 176 is in communication with the outlet nipple 56 of the pump 43 via the conduit means 65. The outlet 178 is in communication with the washer nozzle 66 carried by the wiper arm 20 by a flexible conduit means 68 and the outlet 177 is in communication with the washer nozzle 67 carried by the wiper 21 via the flexible conduit means 69.

The diverter valve means 45 further includes a movable valve member or means 180 which is movable between a first position, as shown in FIG. 10, in which it blocks communication between the inlet 176 and the outlet 178 but unblocks communication between the inlet 176 and the outlet 177 and a second position, as shown in FIG. 11, in which it blocks communication between the inlet 176 and the outlet 177 and unblocks communication between the inlet 176 and the outlet 178. The valve member 180 has an upper head end portion 181, an intermediate shank portion 182 of circular cross section and a stem portion 183. The valve member 180 is made from a suitable metallic material and its head end portion 181 includes a rubber, convex end cap 184 secured to the head end portion 181 which is adapted to a seat against a conical surface or seat 186 at the juncture of the opening portion 174c and the outlet 177 when the latter is in its second position, as shown in FIG. 11. The valve member 180 at its juncture between its head end portion 181 and its intermediate portion 182 defines a conical surface or seat 188 which is adapted to seat against an annular rubber insert or seat 190 carried by the housing 173 at its intermediate opening portion 174b when the valve member is in its first position, as shown in FIG. 10. The head portion 181 of the valve member 180 has a diameter which is less than the diameter of the opening portion 174c to provide an annular passage 192 for communicating the inlet 176 with the outlet 177 when the valve member 180 is in its first position, as shown in FIG. 10. The head portion 181 adjacent its lower end has a plurality of circumferentially spaced lands 194 which are slidably received within the opening portion 174c and which serve to guide the movement of the head portion 181 between its positions. The adjacent lands 194 define recesses 195 therebetween for communicating the inlet 176 with the outlet 178 when the valve member 180 is in its second position, as shown in FIG. 11.

The movement of the valve member 180 between its positions is also guided by a piston 200. The piston 200 has an upper portion 200a which is slidably received within the opening portion 174a and a lower portion 200b of a lesser diameter than the upper portion 200a and which defines with the inner surface of the housing 173 an annular chamber 201. The intermediate portion 182 of the valve member 180 is received within a through central opening 202 in the piston 200 and has an annular recess 203 which receives an annular O-ring seal 204 which engages the inner sides of the piston 200 defining the opening 202 to seal against leakage of fluid through the opening 202. The piston also has an opening 205 which is aligned with the inlet 178 and the intermediate portion 182 of the valve member is of a lesser diameter than the opening 202 to provide for communication between the opening portion 174b and the outlet 178. Surrounding the stem portion 183 of the valve member 180 is an annular flanged collar 206 whose axially extending portion 206a is slidably received within the opening 202 of the piston 200 and abuts the intermediate shank portion 182 of the valve member 181.

The valve member 180 is adapted to be moved between its first and second positions, as shown in FIGS. 10 and 11, respectively, by an actuating means 210. The actuating means 210 comprises a hollow or annular plunger 212 which has a lost motion connection with the stem portion 183 of the valve member 180 and which slidably receives the lower portion 200b of the piston 200. The plunger 212 is vertically slidable with respect to the piston 200. Suitably secured to the plunger 212 at its forward end 212a is a cam follower 214. The cam follower 214 has a convex surface 215 adjacent its lower end and has a pair of diametral opposite slots 216 which slidably receive laterally extending projections 217 on the lower end of the stem portion 183.

The actuating means 210 further includes a first compression spring 218 which is received within an annular recess 219 in the piston 200 and which has one end in abutting engagement with the bottom of the recess 219 and its other end in abutting engagement with the flange portion 206b of the collar 206. The actuating means 210 also includes a second compression spring 220 having one end in abutting engagement with the flange 206b and its other end in abutting engagement with the forward end 212a of the plunger 212. The compression spring 220 exerts greater biasing force than the compression spring 218.

The springs 218 and 220 serve to hold the piston 200 in engagement with a radially extending surface 221 at the juncture of the large and intermediate diameter portions 174a and 174b of the opening 174 and to bias the valve member 180 toward its first position, as shown in FIG. 10, when the actuating means 210 is free of any externally imposed forces. In this position the valve member 180 has its conical surface 188 seated against the annular member 190 and the plunger 212 is biased downwardly by the springs 218 and 220 so that the valve stem 183 is in engagement with the cam follower at the upper end of the slots 216.

The actuating means 210 is adapted to be moved from its first position, as shown in FIG. 10, in opposition to the biasing force of the springs 218 and 220 to its second position, as shown in FIG. 11, by the cam means 76. To this end, the cam means 76 includes an annular cam 230 having a first or lower dwell portion 231, a springs or upper dwell portion 232 and a rise and fall portion 234 and 235. When the cam follower 214 is in engagement with the lower dwell portion 231, the sprints 218 and 220 function to bias the actuator means 210 and the valve member 180 to their lower position, as shown in FIG. 10. The valve member 180 will remain in this position until the cam follower 214 engages the rise portion 234 whereupon it will be cammed upwardly and onto the second dwell portion 232 of the cam 230. As the cam follower 214 and plunger 212 are cammed upwardly, the collar 216 and valve member 180 are moved upwardly in opposition to the biasing force of the spring 218 to the position shown in FIG. 11 wherein the valve member 180 seats against the seat 186.

From the foregoing, it should be apparent that the valve member 180 is alternately moved between its first and second positions, as shown in FIGS. 10 and 11, respectively, every 180° of rotation of the cam means 76. The relative angular orientation of the cam means 76 and the crank arm 29 of the wiper unit 14 is such that when both of the wiper and washer units are placed in operation all of the washer fluid being pumped under pressure by the pump 43 is directed to the washer nozzle 66 and into the path of movement of the wiper 20 during movement of the latter through its inboard stroke and all of the washer fluid is diverted to the washer nozzle 67 and in the path of movement of the wiper 21 when the latter is moved through its outboard stroke.

It should be further apparent that by providing a lost motion connection between the cam follower 214 and the valve stem 183 and that by providing the double spring arrangement, all of the parts (except the stationary housing) can move relative to each other should freezing of the washer fluid occur. This prevents any damage to the parts should the washer fluid freeze.

From the foregoing, it should be apparent that a novel washer unit has been provided in which washer fluid is alternately squirted on the passenger side of the windshield during movement of the wipers through their inboard stroke and on the driver's side of the windshield during movement of the wipers through their outboard stroke. The advantage of this is that all of the washer fluid is wiped away toward the sides of the vehicle and none of the washer fluid is wiped toward the center thereof. This not only maximizes visibility for the driver through the center portion of the windshield, but also eliminates any unsightly washer fluid from dribbling on and drying on the cowl of the vehicle.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield cleaning apparatus for cleaning a windshield of an automotive vehicle comprising:
 a wiper unit having a wiper motor and first and second windshield wipers which are oscillatable in tandem in opposite directions through inboard and outboard strokes during each cycle of operation;
 a washer unit including first and second washer nozzles carried by said first and second windshield wipers for directing washer fluid ahead of the wiper movement during movement of the windshield wipers through their inboard and outboard strokes, respectively, a washer pump for delivering washer fluid under pressure when energized, a diverter valve means having an inlet in communication with said washer pump and first and second outlets in communication with said first and second nozzles, respectively, said diverter valve means including a valve member movable between a first position in which it blocks communication between said inlet and said second outlet and unblocks communication between said inlet and said first outlet and a second position in which it blocks communication between said inlet and said first outlet and unblocks communication between said inlet and said second outlet, a rotatable cam means driven in timed relationship with said wiper motor, an actuating means including spring means operatively connected with said valve member for biasing the same toward its second position, said cam means being in engagement with said actuating means and being operable to effect movement of said valve member to its first position in opposition to the biasing force of the spring means to cause all of the washer fluid delivered by the pump to be directed to the first washer nozzle when said wipers are being moved through their inboard stroke and allowing said actuating means to effect movement of said valve member to its second position to cause all of the washer fluid being delivered by the pump to be directed to the second nozzle when said wipers are moving through their outboard stroke whereby washer fluid is alternately directed ahead of the first wiper during movement thereof through its inboard stroke and ahead of the second wiper during movement thereof through its outboard stroke during each cycle of operation of the wipers.

2. A windshield cleaning apparatus for cleaning a windshield of an automotive vehicle comprising:
a wiper unit including first and second oscillatable windshield wipers which are movable in opposite directions through inboard and outboard strokes during each cycle of operation;
a washer unit including first and second washer nozzles carried by said first and second wipers and located on opposite sides of the first and second wipers, a washer pump for delivering washer fluid under pressure when energized, a diverter valve means having an inlet in communication with the pump and first and second outlets in communication with first and second washer nozzles, respectively, said diverter valve means including a valve member movable between a first position in which it blocks communication between said inlet and said second outlet and unblocks communication between said inlet and said first outlet and a second position in which it blocks communication between said inlet and said first outlet and unblocks communication between said inlet and said second outlet, a rotatable cam having upper and lower dwell portions which extend approximately 180° and rise and fall portions, said cam member being driven in timed relationship with said wiper motor, a cam follower means slidably supported by said diverter valve means and having a lost motion connection with said valve member, spring means for biasing said valve member toward its first position and said cam follower means into engagement with said cam, said cam being operable to effect movement of said valve member from its second position towards its first position in opposition to the biasing force of the spring means when the rise portion of the cam engages the cam follower means to move the same from the lower dwell portion toward the upper dwell portion whereupon said diverter valve means effects delivery of all of the washer fluid from the pump to said first nozzle means when said wipers are being moved through their inboard stroke, said spring means effecting movement of said valve member from its second position towards its first position when the cam follower means engages the fall portion of the cam whereupon said diverter valve means is effected to deliver all of the washer fluid to the second nozzle means when said wipers are being moved through their outboard strokes whereby said washer fluid being delivered by said pump is alternately delivered in the path of the first wiper during movement of the wipers through their inboard stroke and in the path of movement of the second wiper during movement of the wipers through their outboard stroke during each cycle of operation of the wipers.

* * * * *